US010274158B2

(12) United States Patent
Álmosdi et al.

(10) Patent No.: US 10,274,158 B2
(45) Date of Patent: Apr. 30, 2019

(54) METHODS AND APPARATUS FOR USE IN ASSOCIATION WITH LIGHTING SYSTEMS

(71) Applicant: GE Lighting Solutions, LLC, East Cleveland, OH (US)

(72) Inventors: Péter Álmosdi, Budapest (HU); Viktor Zsellér, Budapest (HU); Ákos Péter, Budapest (HU)

(73) Assignee: GE Lighting Solutions, LLC, East Cleveland, OH (US)

( * ) Notice: Subject to any disclaimer, the term of this patent is extended or adjusted under 35 U.S.C. 154(b) by 576 days.

(21) Appl. No.: 14/940,099

(22) Filed: Nov. 12, 2015

(65) Prior Publication Data

US 2017/0138564 A1   May 18, 2017

(51) Int. Cl.
*F21V 5/04* (2006.01)
*F21S 8/08* (2006.01)
(Continued)

(52) U.S. Cl.
CPC ............... *F21V 5/04* (2013.01); *F21S 8/085* (2013.01); *F21S 8/086* (2013.01); *F21V 3/02* (2013.01); *F21V 5/008* (2013.01); *G02B 19/0014* (2013.01); *G02B 19/0061* (2013.01); *F21V 3/06* (2018.02); *F21W 2131/10* (2013.01);
(Continued)

(58) Field of Classification Search
CPC .... F21V 5/04; F21V 5/008; F21V 3/02; F21S 8/085; F21S 8/086; G02B 19/0014; G02B 19/0061
See application file for complete search history.

(56) References Cited

U.S. PATENT DOCUMENTS 6,547,423 B2   4/2003   Marshall et al.
8,591,074 B1   11/2013  Jiang et al.
(Continued)

FOREIGN PATENT DOCUMENTS

DE   102004036850 A1   3/2006
EP       2184530 A2    5/2010
(Continued)

OTHER PUBLICATIONS

International Search Report and Written Opinion issued in connection with corresponding Application No. PCT/US2016/061218 dated Dec. 22, 2016.

*Primary Examiner* — Anabel Ton
(74) *Attorney, Agent, or Firm* — Peter T. DiMauro; GE Global Patent Operation (57) ABSTRACT

In some embodiments, a lighting system comprises: a light source; a lens spaced apart from the light source and including a first surface to receive light from the light source, the lens further including a second surface through which at least a portion of the light received by the lens exits; and a cover spaced from the lens and including a first surface to receive at least a portion of the light that exits the lens, the cover further including a second surface through which at least a portion of the light received by the cover exits; the second surface of the lens including a portion convex with respect to the light source; the first surface of the cover including a portion convex with respect to the light source and disposed over the convex portion of the lens. In some embodiments, the second surface of the cover is flat.

18 Claims, 7 Drawing Sheets

(51) Int. Cl.
   *F21V 3/02* (2006.01)
   *F21V 5/00* (2018.01)
   *G02B 19/00* (2006.01)
   *F21W 131/10* (2006.01)
   *F21W 131/103* (2006.01)
   *F21Y 101/02* (2006.01)
   *F21V 3/06* (2018.01)
   *F21Y 105/10* (2016.01)
   *F21Y 115/10* (2016.01)

(52) U.S. Cl.
   CPC .... *F21W 2131/103* (2013.01); *F21Y 2101/02* (2013.01); *F21Y 2105/10* (2016.08); *F21Y 2115/10* (2016.08)

(56) References Cited

U.S. PATENT DOCUMENTS

| | | | |
|---|---|---|---|
| 8,702,278 | B2 | 4/2014 | Wang et al. |
| 8,864,346 | B2 | 10/2014 | Chinniah et al. |
| 2008/0137333 | A1 | 6/2008 | Tamaoki et al. |
| 2009/0109687 | A1* | 4/2009 | Householder .......... F21L 4/027 362/309 |
| 2009/0225543 | A1 | 9/2009 | Jacobson et al. |
| 2010/0039827 | A1 | 2/2010 | Li |
| 2010/0238669 | A1* | 9/2010 | Holder ...................... F21K 9/00 362/311.02 |
| 2010/0327302 | A1 | 12/2010 | Wang et al. |
| 2011/0320024 | A1 | 12/2011 | Lin et al. |
| 2012/0051047 | A1 | 3/2012 | Lu et al. |
| 2012/0099337 | A1 | 4/2012 | Zhou et al. |
| 2014/0111984 | A1 | 4/2014 | Rodgers et al. |
| 2014/0293607 | A1 | 10/2014 | Wang |
| 2015/0009452 | A1* | 1/2015 | Lee ......................... F21V 5/04 349/64 |
| 2015/0029722 | A1 | 1/2015 | Wang |
| 2015/0115802 | A1 | 4/2015 | Kuti et al. |
| 2015/0276168 | A1 | 10/2015 | Malkmus et al. |

FOREIGN PATENT DOCUMENTS

| | | |
|---|---|---|
| GB | 1254228 A | 11/1971 |
| WO | 2006072885 A1 | 7/2006 |

* cited by examiner

PRIOR ART

METHODS AND APPARATUS FOR USE IN ASSOCIATION WITH LIGHTING SYSTEMS

BACKGROUND OF THE INVENTION

Field

Embodiments of the present disclosure relate generally to methods and apparatus for use in association with lighting systems.

Figure 1A:
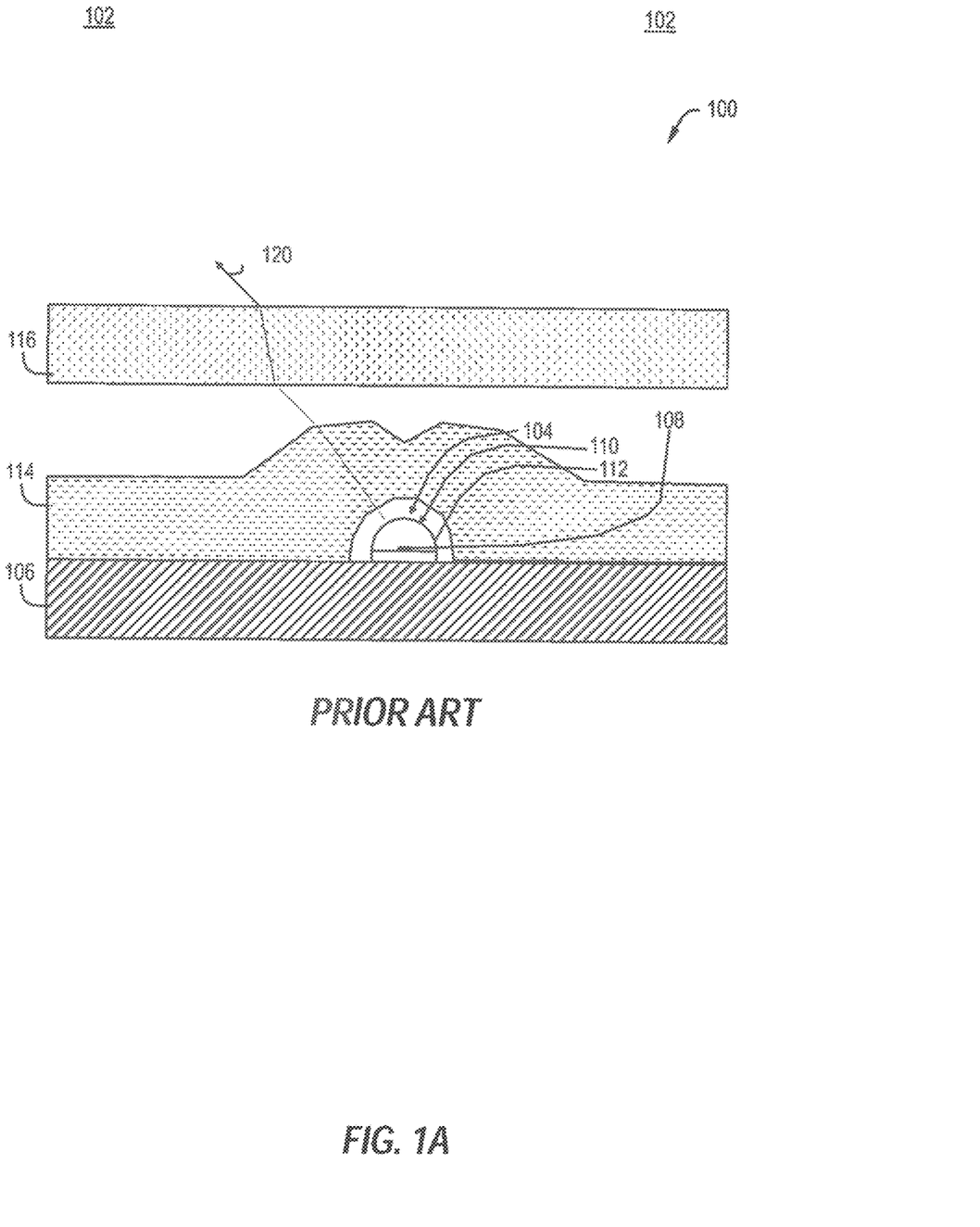
FIG. 1A is a cross-sectional view of a lighting system.

A batwing shaped light distribution may be preferred in various lighting applications, for example, illuminating streets, outdoor areas, pedestrian crossings, roundabouts, garages, rooms and commercial stores. FIG. 1 is a cross-sectional view of a prior art lighting system 100 that produces a batwing shaped light distribution to illuminate an area 102 (e.g., a portion of a street). The system 100 includes a light source 104, which may be disposed on a substrate 106. The light source 104 includes a light emitting diode (LED) 108 or other source of light. The LED 108 or other source of light may be disposed in a package, e.g., an LED package 110, which includes a light transmitting case, e.g., case 112, and the LED 108 or other source of light mounted or otherwise disposed therein. The system 100 further includes a lens 114 and a light transmitting cover 116. In operation, the light source 104 produces light, represented in part by a light ray 120, which passes through the case 112 (if included), the lens 114 and the cover 116 to result in a batwing shaped light distribution.

Brief Description

Figure 1B:
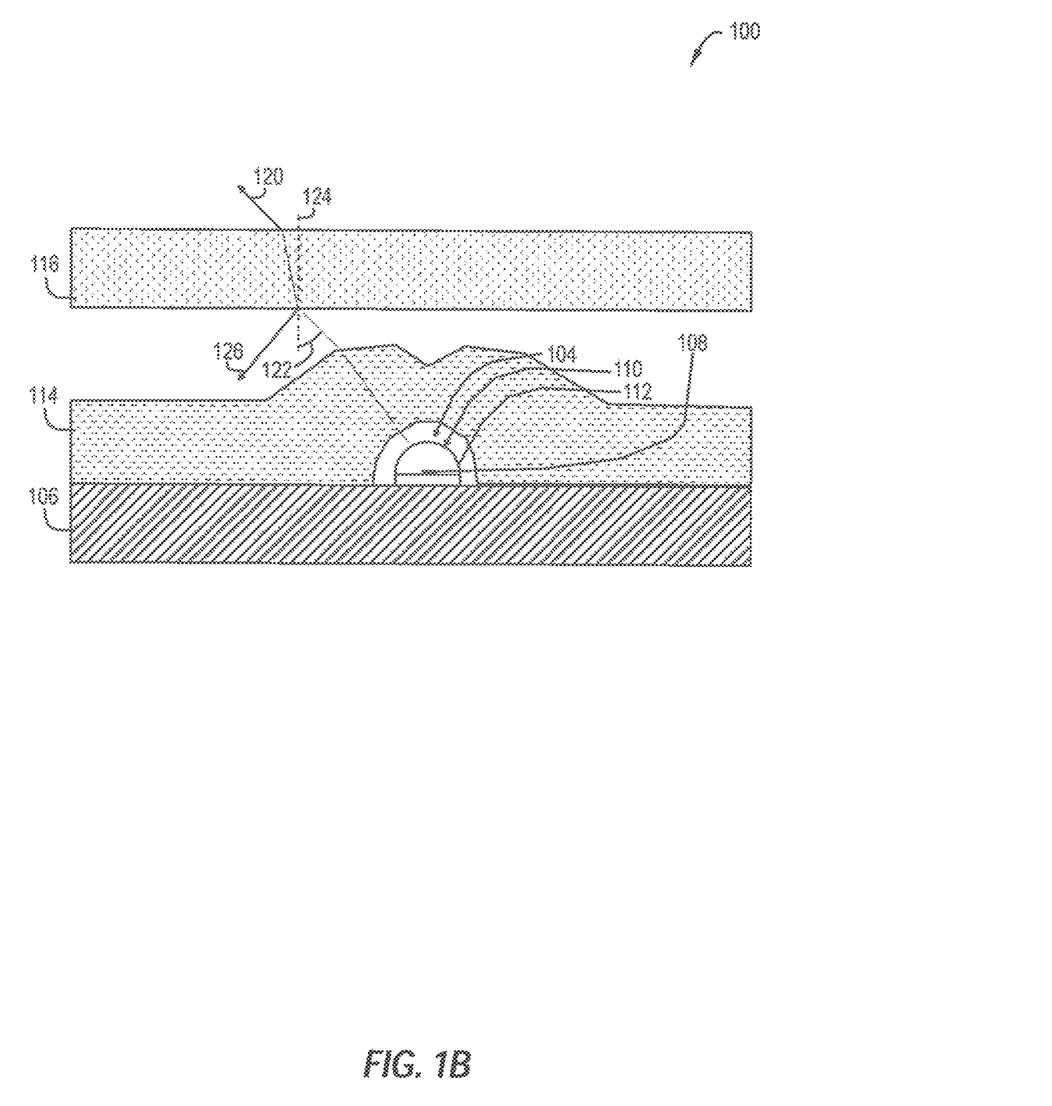
FIG. 1B is a cross-sectional view of a lighting system.

It has been determined that a significant portion of the light 120 that passes through the lens 114 will strike the surface of the cover 116 at an angle 122 (shown in FIG. 1B, relative to a normal line 124) (sometimes referred to as an angle of incidence) that is large enough to cause a significant percentage of the light to be reflected, e.g., represented in part by light ray 126, off the cover 116, rather than transmitted, represented by the light ray 120, through the cover 116, thereby significantly reducing the efficiency of the lighting system 100. It has also been determined that the percentage of light that will be reflected off the cover, rather than transmitted through the cover, could be reduced (thereby increasing efficiency), while still providing a batwing shaped light distribution, if a geometry of the lens and a geometry of the cover are made complementary, in certain respects. As used herein, the term "complementary" means complementary to at least some degree.

It has also been determined that the percentage of light that will be reflected off a cover, rather than transmitted through the cover, could be reduced (thereby increasing efficiency), in applications that do not employ a batwing shaped light distribution, if a geometry of the lens and a geometry of the cover are made complementary, in certain respects.

In a first aspect, a lighting system comprises: a light source and a lens spaced apart from the light source by a first gap. The lens includes a first surface to receive light from the light source. The lens further includes a second surface through which at least a portion of the light received by the first surface of the lens exits the lens. The lighting system further comprises a cover spaced from the lens by a second gap. The cover includes a first surface to receive at least a portion of the light that exits the lens. The cover further includes a second surface through which at least a portion of the light received by the first surface of the cover exits the cover. The second surface of the lens includes a convex portion that is convex with respect to the light source. The first surface of the cover includes a convex portion that is convex with respect to the light source and disposed over the convex portion of the second surface of the lens. The second surface of the lens further includes a first concave portion that is concave with respect to the light source. The first surface of the cover further includes a first concave portion that is concave with respect to the light source and disposed over the concave portion of the second surface of the lens. In some embodiments, the second surface of the cover is flat.

In some embodiments, the at least a portion of the light that exits the cover through the second surface of the cover has a batwing shaped light distribution. In some embodiments, the first surface of the lens faces toward the light source, and the second surface of the lens faces toward the first surface of the cover. In some embodiments, the convex portion of the first surface of the cover receives the convex portion of the second surface of the lens, at least in part. In some embodiments, the convex portion of the first surface of the cover includes two convex portions that are convex with respect to the light source, the first concave portion of the first surface of the cover is disposed between the two convex portions, the convex portion of the second surface of the lens includes two convex portions that are convex with respect to the light source, the first concave portion of the second surface of the lens is disposed between the two convex portions of the convex portion of the second surface of the lens.

In some embodiments, the first surface of the cover further includes a second concave portion that is concave with respect to the light source, the second concave portion of the first surface of the cover includes two concave portions that are concave with respect to the light source, the convex portion of the first surface of the cover is disposed between the two concave portions, the second surface of the lens further includes a second concave portion that is concave with respect to the light source, the second concave portion of the second surface of the lens includes two concave portions that are concave with respect to the light source, and the convex portion of the second surface of the lens is disposed between the two concave portions of the second concave portion of the second surface of the lens. In some embodiments, each of the two concave portions of the second concave portion of the first surface of the cover are disposed over a respective one of the two concave portions of the second concave portion of the second surface of the lens.

In a second aspect, a method comprises spacing a lens apart from a light source by a first gap, the lens including a first surface to receive light from the light source, the lens further including a second surface through which at least a portion of the light received by the first surface of the lens exits the lens. The method further comprises spacing a cover apart from the lens by a second gap, the cover including a first surface to receive at least a portion of the light that exits the lens, the cover further including a second surface through which at least a portion of the light received by the first surface of the cover exits the cover. The second surface of the lens includes a convex portion that is convex with respect to the light source. The first surface of the cover includes a convex portion that is convex with respect to the light source. The second surface of the lens further includes a first concave portion that is concave with respect to the light source. The first surface of the cover further includes a first concave portion that is concave with respect to the light source and disposed over the concave portion of the second surface of the lens.

In a third aspect, a lighting system comprises: a light source and a lens spaced apart from the light source by a first gap. The lens includes a first surface to receive light from the light source. The lens further includes a second surface through which at least a portion of the light received by the first surface of the lens exits the lens. The lighting system further comprises a cover spaced from the lens by a second gap. The cover includes a first surface to receive at least a portion of the light that exits the lens. The cover further includes a second surface through which at least a portion of the light received by the first surface of the cover exits the cover. The second surface of the lens includes a convex portion that is convex with respect to the light source. The first surface of the cover includes a convex portion that is convex with respect to the light source and disposed over the convex portion of the second surface of the lens. The second surface of the cover is flat.

DETAILED DESCRIPTION

Figure 2A:
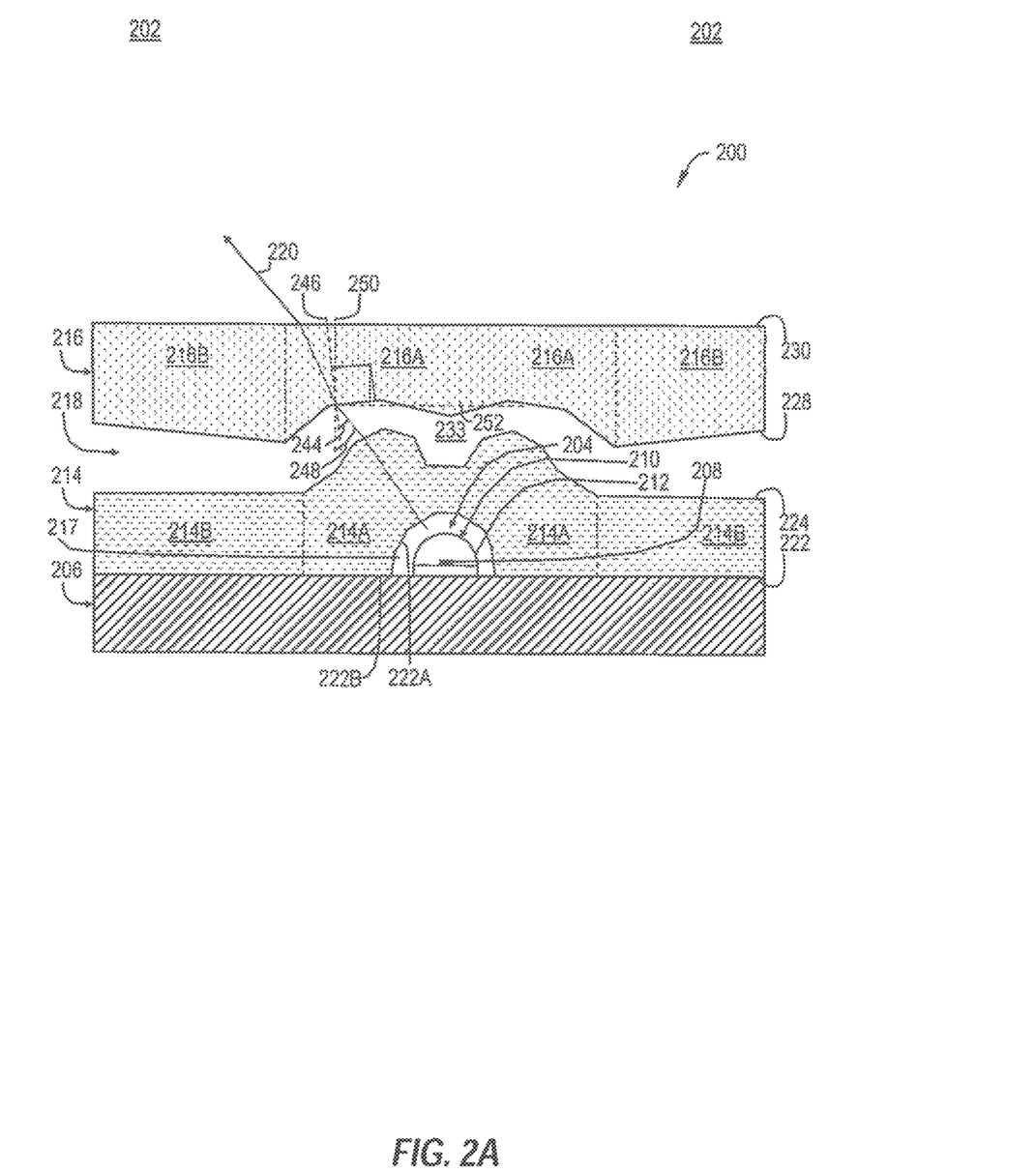
FIG. 2A is a cross-sectional view of a lighting system, in accordance with some embodiments.

FIG. 2A is a cross-sectional view of a lighting system 200 that has a lens and a cover that are complementary, in certain respects, and produces a batwing shaped light distribution to illuminate an area 202 (e.g., a portion of a street), in accordance with some embodiments.

Referring to FIG. 2A, the lighting system 200 includes a light source 204, which may be mounted or otherwise disposed on a substrate 206. The light source 204 may include one or more LEDs, e.g., LED 208, and/or other source(s) of light. In some embodiments, one or more of the LEDs and/or other source(s) of light may be disposed in one or more packages, e.g., LED package 210. Each such package may include a light transmitting case, e.g., a case 212 (sometimes referred to herein as an integrated primary (first) optic), and one or more of the LEDs, e.g., LED 208, and/or other source(s) of light, which may be mounted or otherwise disposed therein. If the light source 204 includes more than one source of light and/or package, the sources of light and/or packages may be disposed in a strip or other configuration.

The substrate 206, if included, may support the light source 204 and/or any other part of the lighting system 200 disposed thereon. In some embodiments, the substrate 206 comprises a material or materials that blocks and/or reflect light.

As used herein, the phrase "disposed on" means "disposed directly on" or "disposed indirectly on". Unless stated otherwise, the term "on" does not necessarily mean "on top of" since relative position (above or below) depends on orientation.

The lighting system 200 further includes a lens 214 (sometimes referred to herein as a secondary (second) optic) and a light transmitting cover 216 (sometimes referred to herein as a tertiary (third) optic). The lens 214 may be spaced apart from the light source 204 by a first gap 217. The cover 216 may be spaced apart from the lens 214 by a second gap 218.

Figure 2B:
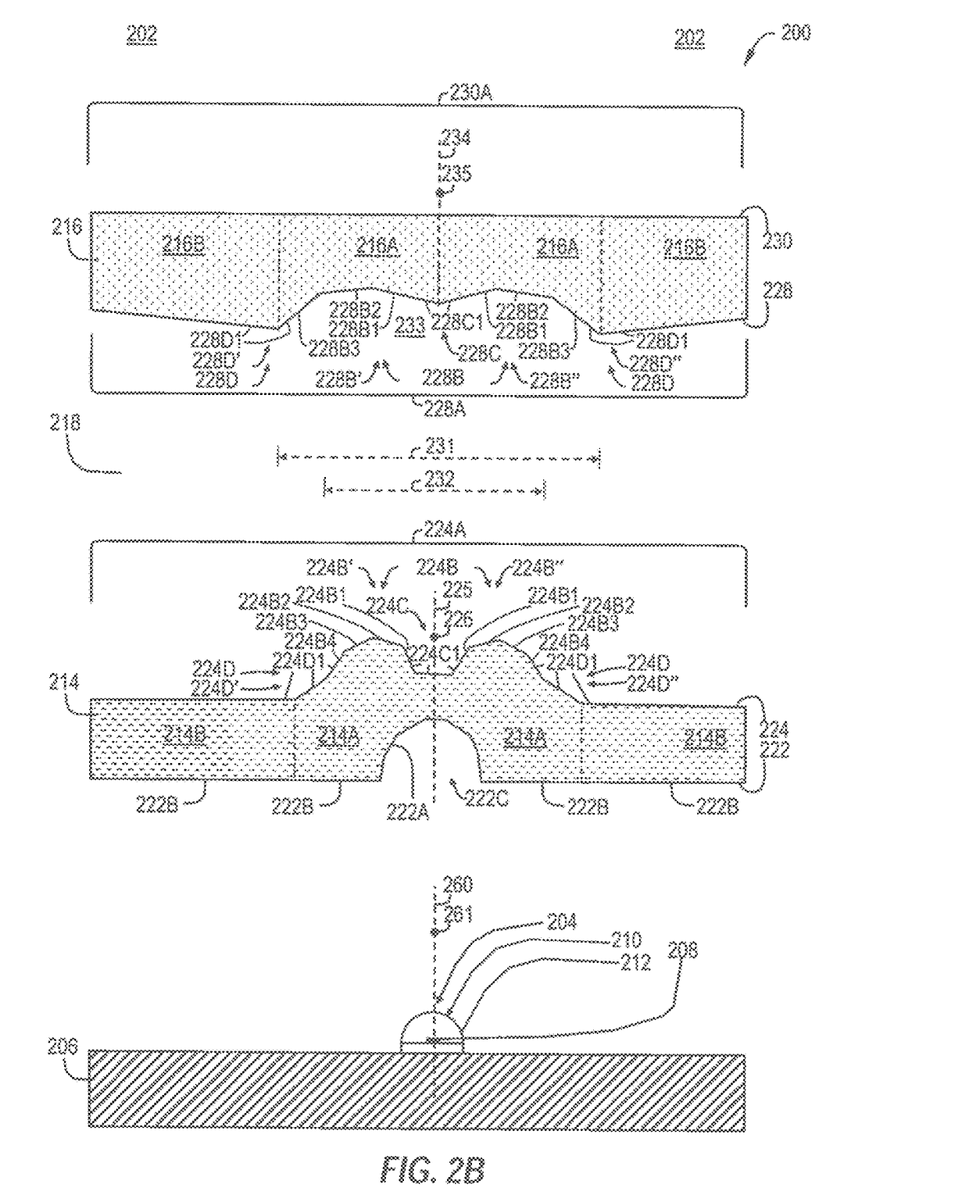
FIG. 2B is a cross-sectional, partially exploded, view of a lighting system, in accordance with some embodiments.

FIG. 2B is a partially exploded, cross-sectional view of the lighting system 200 including the lens 214 and the cover 216, in accordance with some embodiments.

Referring to FIG. 2B, in accordance with some embodiments, the lens 214 may include a first portion 214A and a second portion 214B. The first portion 214A may be a main beam shaping portion of the lens 214. The second portion 214B may be a peripheral portion of the lens 214.

As used herein, a "portion" may have any configuration and may itself be made up of multiple portions, which may or may not be integral and/or contiguous with one another.

The lens 214 may further include a first side 222 and a second side 224. The first side 222 may include a first surface 222A, which may face toward the light source 204 and/or receive light therefrom.

As used herein, the phrase "face toward" means "have one or more portions that face to at least some degree". (In the illustrated embodiment, all portions of the first surface 222A face the light source 204 to at least some degree.)

In some embodiments, the first surface 222A defines a recess 222C to receive the light source 204, at least in part. The first side 222 of the lens 214 may further include a surface 222B, which may be disposed on the substrate 206. The second side 224 of the lens 214 may include a second surface 224A, through which at least a portion of the light received by the first surface 222A exits the lens 214. The second surface 224A may face toward the cover 216 (in the illustrated embodiment, all portions of the second surface 224A face the cover 216 to at least some degree) and/or away from the light source 204. The second surface 224A may include a convex portion 224B.

As used herein, the term "convex portion" means a portion that is convex (i.e., curving outward in one or more directions and/or extending outward in one or more directions).

In the illustrated embodiment, the convex portion 224B extends outward (e.g., relative to the light source 204) in one or more directions. A convex portion may or may not include a curved surface that is similar to that of a circle, a sphere, an aspherical surface, etc. Thus, in some embodiments, a convex portion may include one or more linear and/or planar segments. One or more of the one or more linear and/or planar segments may be similar, in some way, to one or more line segments of a convex polygon.

In the illustrated embodiment, the convex portion 224B includes a plurality of linear and/or planar segments 224B1-224B4.

In some embodiments, a convex portion may be strictly convex with no linear and/or planar segments.

The lens 214 (and/or portion(s) thereof) may have an axis. In some embodiments, the axis may be a radial axis 225. In some other embodiments, the axis may be a longitudinal axis (represented by an arrow 226 pointing into the page), in which case the lens 214 may be elongated in the direction of the longitudinal axis 226. If the lens 214 has a radial axis 225, the convex portion 224B may be disposed circumferentially about such axis 225. If the lens 214 has a longitudinal axis 226, the convex portion 224B may be elongated in the direction of the longitudinal axis 226, which may bifurcate the convex portion 224B. In either case, the lens 214 may be axially symmetrical or axially asymmetrical (e.g., to skew the batwing shape light distribution in one or more directions).

As with the lens 214, the cover 216 may include a first side 228 and a second side 230. The first side 228 may include a first surface 228A, which may face toward the second surface 224A of the lens 214 and may receive at least a portion of the light that exits therefrom.

The first surface 228A may include a convex portion 228B, which may have a geometry and position to complement the geometry and position of the convex portion 224B of the second surface 224A of the lens 214.

In the illustrated embodiment, the convex portion 228B extends outward (e.g., relative to the light source 204) in one or more directions.

The convex portion 228B may have a width 231 greater than a width 232 of the convex portion 224B of the second surface 224A of the lens 214.

In some embodiments, the convex portion 228B is disposed over, in register with and/or in light path registration with, the convex portion 224B of the second surface 224A of the lens 214.

As used herein, the term "over" means "over, at least in part". Thus, the term "over" includes "partially over" and "fully over".

As used herein, the phrase "the convex portion 228B is in light path registration with the convex portion 224B" means that a least a portion of the light from the light source will exit the lens through the convex portion 224B of the second surface 224A of the lens 214 and will strike the convex portion 228B of the first surface 228A of the cover 216.

In some embodiments, the convex portion 228B defines a recess 233 that receives the convex portion 224B of the second surface 224A of the lens 214, at least in part.

In the illustrated embodiment, the convex portion 228B includes a plurality of linear and/or planar segments 228B1, 228B2, 228B3. One or more of the linear and/or planar segments may be parallel or nearly parallel to one or more of the linear and/or planar segments 224B1-224B4 of the convex portion 224B of the second surface 224A of the lens 214. In the illustrated embodiment, the linear and/or planar portion 228B1 is parallel or nearly parallel to the linear and/or planar portion 224B2.

As with the lens 214, the cover 216 (and/or portion(s) thereof) may also have an axis. In some embodiments, the axis may be a radial axis 234. In some other embodiments, the axis may be a longitudinal axis (represented by an arrow 235 pointing into the page), in which case the cover 216 may be elongated in the direction of the longitudinal axis 235. If the cover 216 has a radial axis 234, the convex portion 228B may be disposed circumferentially about such axis 234. If the cover 216 has a longitudinal axis 235, the convex portion 228B may be elongated in the direction of the longitudinal axis 235, which may bifurcate the convex portion 228B. In either case, the cover 216 may be axially symmetrical or axially asymmetrical (e.g., to skew the batwing shape light distribution in one or more directions).

If the lens 214 and cover 216 each have an axis, the axis of the cover 216 may be aligned with (i.e., in line with or parallel to) the axis of the lens 214. Thus, if the lens 214 and cover 216 each have a radial axis, the radial axis of the cover 216 may be in line with the radial axis of the lens 214. If the lens 214 and cover 216 each have a longitudinal axis, the longitudinal axis of the cover 216 may be parallel to the longitudinal axis of the lens 214.

The second side 230 of the cover 216 may face toward the area 202 to be illuminated by the lighting system 200 (and/or away from the light source 204 and lens 214) and may include a second surface 230A through which at least a portion of the light received by the first surface 228A of the cover 216 exits the cover 216.

In accordance with some embodiments, the second surface 228A of the cover 216 may be flat to facilitate cleaning of the second surface 230A.

In accordance with some embodiments, the term "flat" means flat to within 0.1 millimeter (mm) over each square millimeter (mm$^2$) of the surface.

The lighting system 200 may further include drive circuitry (not shown) coupled between the light source 204 and a power source (e.g., an AC power source, not shown) and may further include a heatsink and/or other cooling features (not shown). The drive circuitry may be configured to receive power from the power source and to supply power to the light source 204.

The heatsink and/or other cooling features may help remove heat from, or prevent heat from reaching, the light source 204.

In operation, the light source 204 produces light, represented in part by a light ray 220, which passes through the case 212 (if included), the first gap 217, the lens 214, the second gap 218 and the cover 216 to result in a desired batwing shaped light distribution.

In passing through the lens 214, light enters the lens 214 through the first surface 222A of the lens 214 and exits the lens 214 through the second surface 224A of the lens 214. At least a portion of the light that exits the lens 214 through the second surface 224A does so through the convex portion 224B.

In passing through the cover 216, light enters the cover 216 through the first surface 228A of the cover 216 and exits the cover 216 through the second surface 230A of the cover 216. At least a portion of the light that enters the cover 216 through the first surface 228A does so through the convex portion 228B after passing through the convex portion 224B of the second surface 224A of the lens 214.

Referring also again to FIG. 2A, because at least a portion of the light that enters the cover 216 through the first surface 228A does so through the convex portion 228B after passing through the convex portion 224B of the second surface 224A of the lens 214, at least a portion of the light 220 that strikes the cover 216 does so at an angle of incidence 244 (relative to a normal 246 to the first surface 228A of the cover 216) that is less than an angle of incidence 248 (relative to a normal 250) at which the portion of the light 220 would strike the cover 216 if the first surface 228A of the cover 216 was flat and parallel 252 to the second surface 230A of the cover 216, as in the prior art lighting system 100 (FIG. 1).

Consequently, the percentage of light that is reflected, rather than transmitted, by the surface of the cover 216, is less than the percentage of light 120 that is reflected, rather than transmitted, in the prior art lighting system 100 (FIG. 1). This increases efficiency, while still allowing the lighting system 200 to provide a batwing shaped light distribution.

The second surface 224A of the lens 214 may further include a first concave portion 224C and/or a second concave portion 224D.

As used herein, the term "concave portion" means a portion that is "concave" (i.e., curving inward in one or more directions and/or extending inward in one or more directions).

In the illustrated embodiment, the first concave portion 224C and the second concave portion 224D each extend inward (e.g., relative to the light source 204) in one or more directions. A concave portion may or may not have a curved surface. Thus, in some embodiments, a convex portion may include one or more linear and/or planar segments. One or more of the one or more linear and/or planar segments may be similar, in some way, to one or more line segments of a concave polygon.

In the illustrated embodiment, the first concave portion 224C includes a plurality of linear and/or planar segments 224C1. In some embodiments, one of such linear and/or planar segments 224C1 may be parallel to the second surface 230A of the cover 216.

It should be recognized that the linear and/or planar segment 224B1 can be viewed as part of convex portion 224B and part of concave portion 224C. Thus, a portion of a surface may be part of a convex portion and also part of a concave portion.

In the illustrated embodiment, the second concave portion 224D includes a plurality of linear and/or planar segments 224D1. In some embodiments, one or more of such linear and/or planar segments 224C1 may be parallel to the second surface 230A of the cover 216. In some embodiments, the first concave portion 224C is disposed between two portions of the convex portion 224B.

In the illustrated embodiment, for example, convex portion 224B includes two convex portions 224B', 224B". One of the convex portions (224B') is disposed to the left of the concave portion 224C and one of the convex portions (224B") is disposed to the right of the concave portion 224C.

In some embodiments, the convex portion 224B is disposed between two portions of the second concave portion 224D. In the illustrated embodiment, for example, concave portion 224D includes two concave portions 224D', 224D". One of the concave portions (224D') is disposed to the left of the convex portion 224B and one of the concave portions (224D") is disposed to the right of the convex portion 224B.

If the lens 214 has a radial axis 225, the convex portion 224B, the first concave portion 224C and/or the second concave portion 224D may be disposed circumferentially about such axis 225. The first concave portion 224C may be disposed radially inward of the convex portion 224B. The convex portion 224B may be disposed radially inward of the second concave portion 224D.

If the lens 214 has a longitudinal axis 226, the convex portion 224B, the first concave portion 224C and/or the second concave portion 224D may be elongated in the direction of the longitudinal axis 226. The longitudinal axis 226 may bifurcate the convex portion 224B, the first concave portion 224C and/or the second concave portion 224D into elongated sub-portions. The first concave portion 224C may bifurcate the convex portion 224B into two elongated sub-portions. The first concave portion 224C and the convex portion 224B may bifurcate the concave portion 224D into two elongated sub-portions.

As with the lens 214, the first surface 228A of the cover 216 may further include a first concave portion 228C and/or a second concave portion 228D.

In the illustrated embodiment, the first concave portion 228C and the second concave portion 228D each extend inward (e.g., relative to the light source 204) in one or more directions.

The first concave portion 228C may complement the first concave portion 224C of the second surface 224A of the lens 214 and may be disposed over, in register with and/or in light path registration with, the first concave portion 224C of the second surface 224A of the lens 214.

The second concave portion 228D may complement the second concave portion 224D of the second surface 224A of the lens 214 and may be disposed over, in register with and/or in light path registration with, the second concave portion 224D of the second surface 224A of the lens 214.

In the illustrated embodiment, the first concave portion 228C includes a plurality of linear and/or planar segments 228C1, none of which are parallel to the second surface 230A of the cover 216.

In the illustrated embodiment, the second concave portion 228D includes a plurality of linear and/or planar segments 228D1, none of which are parallel to the second surface 230A of the cover 216.

In some embodiments, first concave portion 228C is disposed between two portions of convex portion 228B. In the illustrated embodiment, for example, convex portion 228B includes two convex portions 228B', 228B". One of the convex portions (228B') is disposed to the left of the concave portion 228C and one of the convex portions (228B") is disposed to the right of the concave portion 228C.

In some embodiments, convex portion 228B is disposed between two portions of second concave portion 228D. In the illustrated embodiment, for example, concave portion 228D includes two concave portions 228D', 228D". One of the concave portions (228D') is disposed to the left of the convex portion 228B and one of the concave portions (228D") is disposed to the right of the convex portion 228B.

As with the lens 214 and the cover 216, the light source 204 may have an axis. In some embodiments, the axis may be a radial axis 260. In some other embodiments, the axis may be a longitudinal axis (represented by an arrow 261 pointing into the page). If the light source 204 has a radial axis 260, the light source 204 may be disposed circumferentially about such axis 260. If the light source 204 has a longitudinal axis 261, the light source 204 may be elongated in the direction of such axis 261.

If the light source 204, the lens 214 and the cover 216 each have an axis, the axis of the light source 204 may be aligned with (i.e., in line with or parallel to) the axis of the lens 214 and/or the axis of the cover 216.

Figure 3:
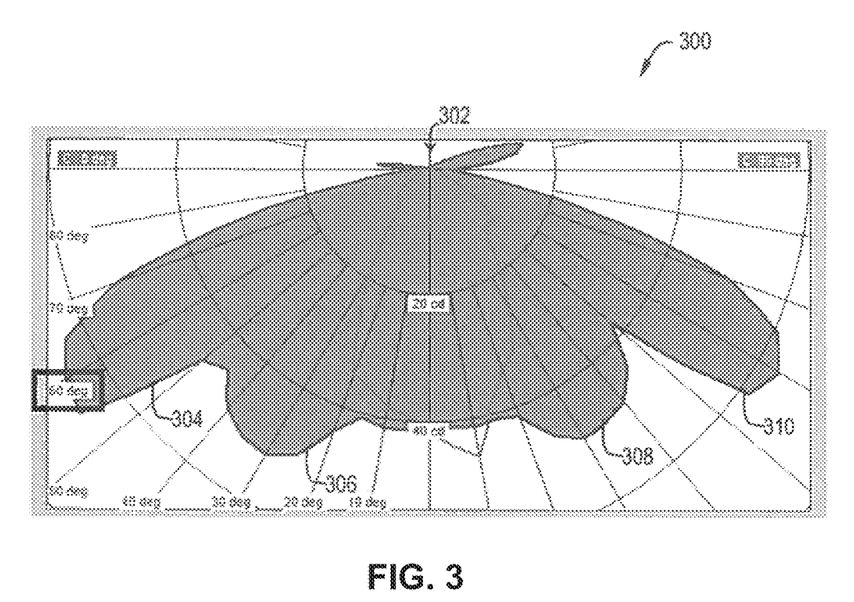
FIG. 3 is a graphical representation of a batwing shaped light distribution that may be provided, in accordance with some embodiments.

FIG. 3 is a graphical representation of a batwing shaped light distribution 300 that is required in some applications, and met or exceeded by the lighting system 200, in accordance with some embodiments.

Referring to FIG. 3, in accordance with some embodiments, the batwing shaped light distribution 300 has an origin point 302 and major lobes 304, 306, 308 and 310.

In some embodiments, approximately seventy percent of the optical power of the batwing shaped light distribution 300 is directed approximately towards the sixty degree azimuths. In some embodiments, one or more portions of the light source 204, lens 214 and/or cover 216 may have a shape that differs from an illustrated shape so as to result in a batwing shaped light distribution that is different from the batwing shaped light distribution 300.

In some embodiments, one or more portions of the light source 204, lens 214 and/or cover 216 may have an asymmetrical shape so as to at least partially skew the batwing shaped light distribution 300 to one side. In some embodiments, one or more portions of the light source 204, lens 214 and/or cover 216 may have a shape that differs from an illustrated shape so as to result in a light distribution that is not a batwing shaped light distribution.

Figure 4:
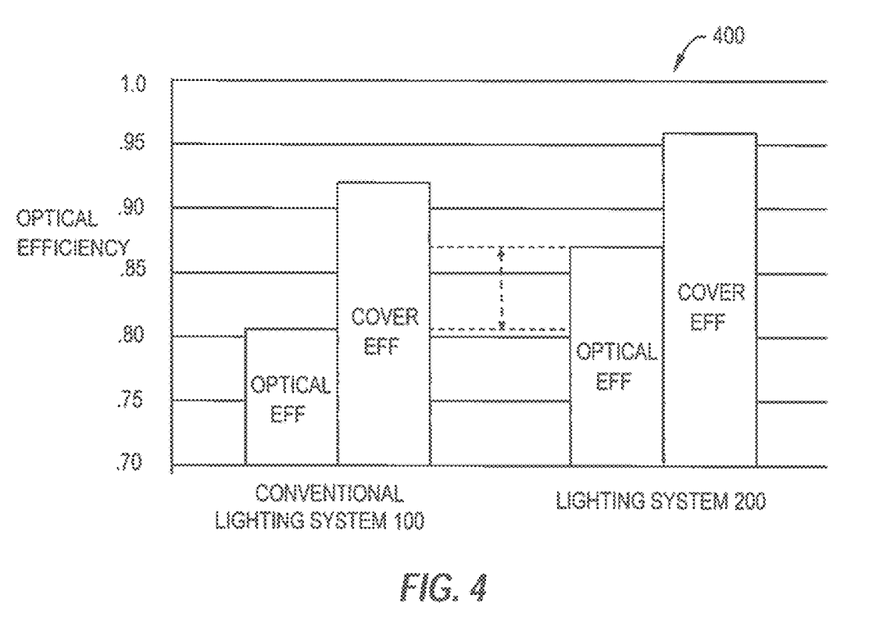
FIG. 4 is a graphical representation of an efficiency comparison, in accordance with some embodiments.

FIG. 4 is a graphical representation of an efficiency comparison 400, in accordance with some embodiments.

Referring to FIG. 4, the efficiency comparison 400 indicates that the conventional lighting system 100 (FIG. 1) may have an optical efficiency of about 80.5% and a cover efficiency of about 92%. In accordance with some embodiments, the lighting system 200 may have an optical efficiency of about 87% and a cover efficiency of about 0.96%. Thus, in accordance with some embodiments, the lighting system 200 provides a 6.5% increase in optical efficiency and a 4% increase in cover efficiency compared to the conventional lighting system 100 (FIG. 1).

For purposes of the comparison, the efficiency of the conventional system 100 was determined based on a benchmarking of a CARCLO 84 Retro Lens. The efficiency of the lighting system 200 was determined based on a ray-tracing simulation of an initial design in accordance with some embodiments.

Figure 5:
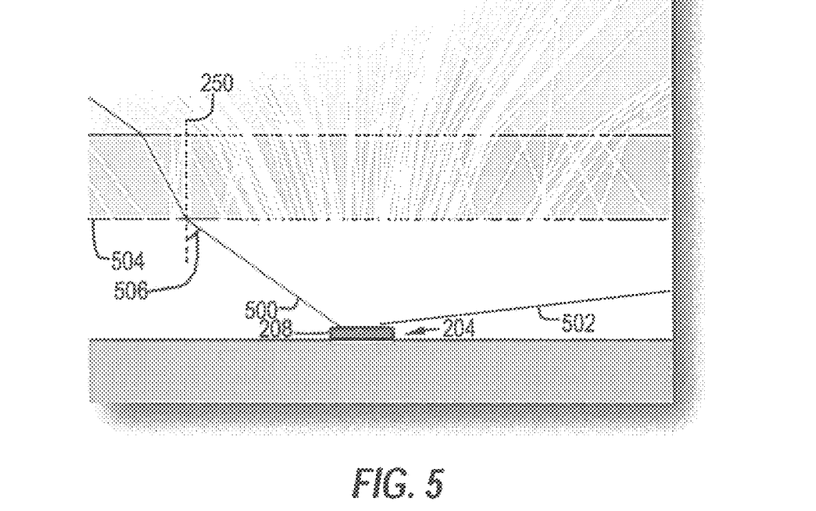
FIG. 5 is a cross-sectional view of one or more embodiments of a light source and light produced thereby.

FIG. 5 is a cross-sectional view of one or more embodiments of the light source 204, and light produced thereby, in combination with an independent planar optic.

Referring to FIG. 5, in accordance with some embodiments, the light source 204 may include an LED, e.g., LED 208, and/or other source of light. The LED, e.g., LED 208, and/or other source may produce light, represented in part by light rays 500, 502. Portions of the light produced by the light source 204 are shown striking a planar optic 504 that is independent of the light source 204. Some of the light striking the planar optic 504 does so at an angle of incidence 506 (relative to a normal 508) that results in the light being transmitted through the planar optic 504. Some of the light striking the planar optic 504 does so at an angle of incidence that results in the light being reflected, rather than transmitted.

Figure 6:
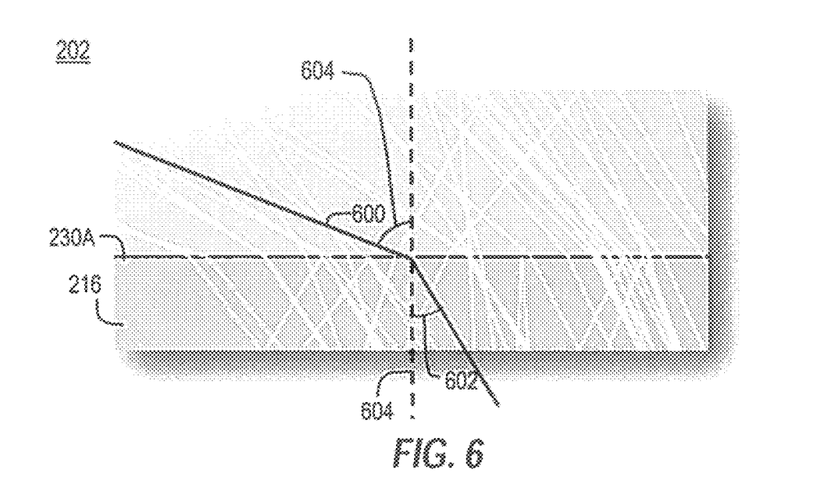
FIG. 6 is an enlarged cross-sectional view of a portion of a cover and a portion of light produced by a light source, in accordance with some embodiments.

FIG. 6 is an enlarged cross-sectional view of a portion of the cover 216 and a portion of the light produced by the light source 204, in accordance with some embodiments.

Referring to FIG. 6, in accordance with some embodiments, some of the light, represented by a light ray 600, that enters the cover 216 strikes the second surface 230A of the cover 216 at an angle of incidence 602 (relative to a normal 604) and exits the cover at an angle 604 (sometimes referred to as an angle of refraction) (relative to the normal 604). The angle of refraction depends on the index of refraction of the material from which the cover 216 is fabricated, the index of refraction of the material outside the second surface 230A of the cover 216, and the angle of incidence.

Some of the light that enters the cover 216 may strike the second surface 230A of the cover 216 at an angle (sometimes referred to as a critical angle) that results in total internal reflection. The critical angle depends on the index of refraction of the material from which the cover 216 is fabricated and the index of refraction of the material outside the second surface 230A. In accordance with some embodiments, it may be desirable to have light exit the second surface 230A of the cover 216 at an angle of refraction equal to 60 degrees or approximately 60 degrees. It may also be desirable to limit and/or reduce total internal reflection. In some embodiments, the cover is fabricated of tempered glass and the material outside the second surface of the cover is air.

Table 1 shows the critical angle as well as the angle of incidence required to result in an angle of refraction equal to 60 degrees, if the cover is fabricated of tempered glass and the material outside the second surface of the cover is air.

TABLE 1

| | |
|---|---|
| Material of Cover | Tempered Glass |
| Index of Refraction | 1.5 |
| Material Outside Second Surface of Cover | Air |
| Critical Angle for Total Internal Reflection | 42.1 degrees |
| Angle of Incidence To Result Angle of Refraction Equal to 60 Degrees | 35.26 |

In some embodiments, the cover is fabricated of polycarbonate and the material outside the second surface of the cover is air.

Table 2 shows the critical angle as well as the angle of incidence required to result in an angle of refraction equal to 60 degrees, if the cover is fabricated of polycarbonate and the material outside the second surface of the cover is air.

TABLE 2

| | |
|---|---|
| Material of Cover | Polycarbonate |
| Index of Refraction | 1.58 |
| Material Outside Second Surface of Cover | Air |
| Critical Angle for Total Internal Reflection | 39.14 degrees |
| Angle of Incidence To Result Angle of Refraction Equal to 60 Degrees | 33.23 |

Figure 7:
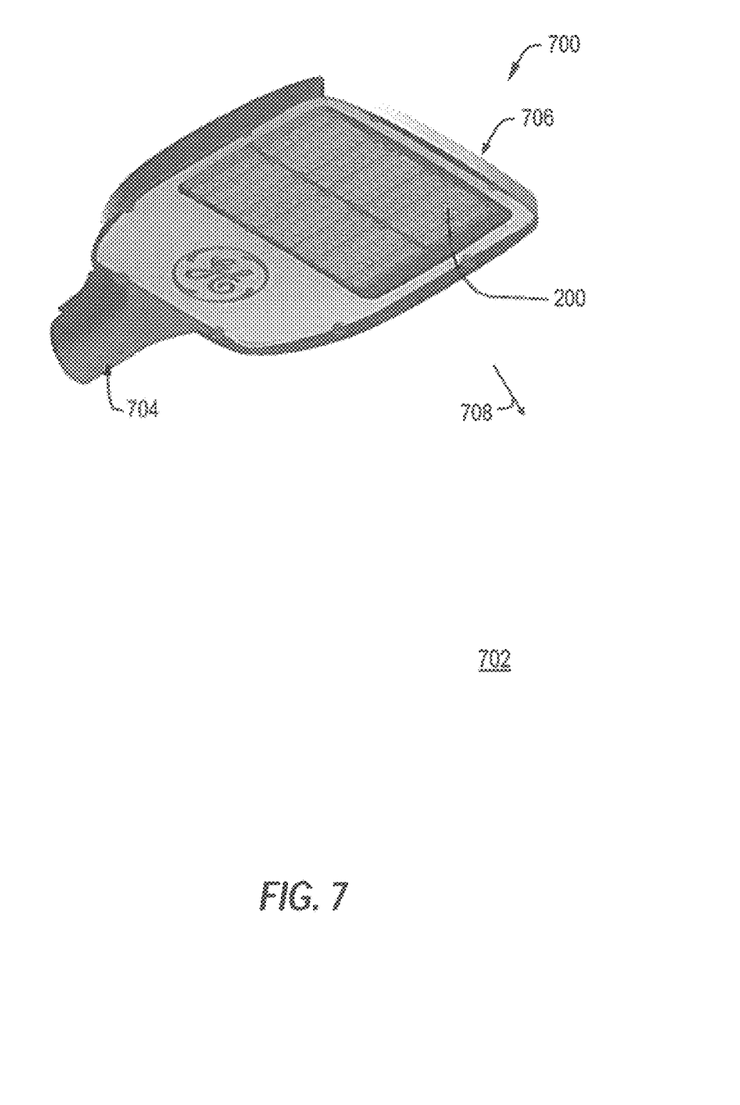
FIG. 7 is a perspective view of a light assembly that includes one or more embodiments of a lighting system, in accordance with some embodiments.

FIG. 7 is a perspective view of a light assembly 700 that includes one or more embodiments of the lighting system 200 and may be used in illuminating a street and/or other outdoor area 702, in accordance with some embodiments.

Referring to FIG. 7, in accordance with some embodiments, the light assembly 700 includes a pole or other support 704 and a fixture 706 coupled thereto. The pole or other support 704 may be coupled to a base (not shown). The fixture 706 includes one or more embodiments of the lighting system 200. In operation, the one or more embodiments of the lighting system 200 produces light, represented by a light ray 708, which may be used in illuminating a street and/or other outdoor area 702. In accordance with some embodiments, the case 212, the lens 214, the cover 216 and/or any other optic disclosed herein may be fabricated from any optical material(s) using any process(es) that result in an optic that is transparent. In some embodiments, the case 212, the lens 214, the cover 216 and/or any other optic disclosed herein may be fabricated from a rigid optical polymer, for example, polycarbonate and/or polymethylmethacrylates using an injection molding and/or an extrusion process. In some embodiments, the case 212, the lens 214, the cover 216 and/or any other optic disclosed herein may be formed from any transparent polymers, silicones, glasses (tempered or otherwise), or ceramics using injection molding, extrusion, machining, polishing or casting.

In some embodiments, the case 212, lens 214, the cover 216 and/or any other optic disclosed herein may be formed of a solid optical material(s) having an index of refraction greater than 1.

In some embodiments, the first gap 217 and/or the second gap 218 is filled with air and/or other material(s) having an index of refraction that is less than the index of refraction of the case 212, the lens 214, and/or the cover 216.

In some embodiments, the lighting system 200 may be fabricated as a single integral component. In some other embodiments, the lighting system 200 may be fabricated in two or more pieces that are subsequently attached, assembled or otherwise coupled together. In some of the latter embodiments (in which the lighting system 200 is fabricated in pieces), one or more portions of the lighting system 200 may nonetheless be fabricated integral with another portion of the lighting system 200.

In some embodiments, the lighting system 200 (or portion(s) thereof) may include one or more additional feature (and/or component) and/or one or fewer feature (and/or component).

As used herein, the term "between" means "between, at least in part". Thus, the term "between" includes "partially between" and "fully between". Unless stated otherwise, the terms "on", "over" and "between" do not necessarily mean "adjacent to" since the terms "on", "over" and "between" do not preclude elements and/or space in-between. In addition, unless otherwise stated, terms such as, for example, "in response to" and "based on" mean "in response at least to" and "based at least on", respectively, so as not to preclude being responsive to and/or based on, more than one thing. In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second". Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A lighting system comprising:
   a light source;
   a lens spaced apart from the light source by a first gap and including a first surface to receive light from the light source, the lens further including a second surface through which at least a portion of the light received by the first surface of the lens exits the lens; and
   a cover spaced from the lens by a second gap and including a first surface to receive at least a portion of the light that exits the lens, the cover further including a second surface through which at least a portion of the light received by the first surface of the cover exits the cover;
   wherein the second surface of the lens includes a convex portion that is convex with respect to the light source;
   wherein the first surface of the cover includes a convex portion that is convex with respect to the light source and disposed over the convex portion of the second surface of the lens;
   wherein the second surface of the lens further includes a first concave portion that is concave with respect to the light source; and
   wherein the first surface of the cover further includes a first concave portion that is concave with respect to the light source and disposed over the concave portion of the second surface of the lens; and further,
   wherein the first surface of the lens faces toward the light source;
   wherein the second surface of the lens faces toward the first surface of the cover; and
   wherein the at least a portion of the light that exits the cover through the second surface of the cover has a batwing shaped light distribution.

2. The lighting system of claim 1, wherein the second surface of the cover is flat.

3. The lighting system of claim 1, wherein the convex portion of the first surface of the cover receives the convex portion of the second surface of the lens, at least in part.

4. The lighting system of claim 1, wherein the convex portion of the first surface of the cover includes two convex portions that are convex with respect to the light source;
   wherein the first concave portion of the first surface of the cover is disposed between the two convex portions;
   wherein the convex portion of the second surface of the lens includes two convex portions that are convex with respect to the light source;
   wherein the first concave portion of the second surface of the lens is disposed between the two convex portions of the convex portion of the second surface of the lens.

5. The lighting system of claim 4, wherein the first surface of the cover further includes a second concave portion that is concave with respect to the light source;
   wherein the second concave portion of the first surface of the cover includes two concave portions that are concave with respect to the light source;
   wherein the convex portion of the first surface of the cover is disposed between the two concave portions;
   wherein the second surface of the lens further includes a second concave portion that is concave with respect to the light source;
   wherein the second concave portion of the second surface of the lens includes two concave portions that are concave with respect to the light source; and
   wherein the convex portion of the second surface of the lens is disposed between the two concave portions of the second concave portion of the second surface of the lens.

6. The lighting system of claim 5, wherein each of the two concave portions of the second concave portion of the first surface of the cover are disposed over a respective one of the two concave portions of the second concave portion of the second surface of the lens.

7. A method comprising:
   spacing a lens apart from a light source by a first gap, the lens including a first surface to receive light from the light source, the lens further including a second surface through which at least a portion of the light received by the first surface of the lens exits the lens; and
   spacing a cover apart from the lens by a second gap, the cover including a first surface to receive at least a portion of the light that exits the lens, the cover further including a second surface through which at least a portion of the light received by the first surface of the cover exits the cover, wherein the second surface of the cover is flat;
   wherein the second surface of the lens includes a convex portion that is convex with respect to the light source;
   wherein the first surface of the cover includes a convex portion that is convex with respect to the light source and;
   wherein the second surface of the lens further includes a first concave portion that is concave with respect to the light source; and
   wherein the first surface of the cover further includes a first concave portion that is concave with respect to the light source and disposed over the concave portion of the second surface of the lens.

8. A method comprising:
   spacing a lens apart from a light source by a first gap, the lens including a first surface to receive light from the light source, the lens further including a second surface through which at least a portion of the light received by the first surface of the lens exits the lens; and spacing a cover apart from the lens by a second gap, the cover including a first surface to receive at least a portion of the light that exits the lens, the cover further including a second surface through which at least a portion of the light received by the first surface of the cover exits the cover, wherein the second surface of the cover is flat;

wherein the second surface of the lens includes a convex portion that is convex with respect to the light source;

wherein the first surface of the cover includes a convex portion that is convex with respect to the light source and;

wherein the second surface of the lens further includes a first concave portion that is concave with respect to the light source; and wherein the first surface of the cover further includes a first concave portion that is concave with respect to the light source and disposed over the concave portion of the second surface of the lens;

the method further comprising:

facing the first surface of the lens faces toward the light source; and facing the second surface of the lens toward the first surface of the cover;

wherein the at least a portion of the light that exits the cover through the second surface of the cover has a batwing shaped light distribution.

9. The method of claim 7, wherein the convex portion of the first surface of the cover receives the convex portion of the second surface of the lens, at least in part.

10. The method of claim 7, wherein the convex portion of the first surface of the cover includes two convex portions that are convex with respect to the light source;

wherein the first concave portion of the first surface of the cover is disposed between the two convex portions;

wherein the convex portion of the second surface of the lens includes two convex portions that are convex with respect to the light source;

wherein the first concave portion of the second surface of the lens is disposed between the two convex portions of the convex portion of the second surface of the lens.

11. The method of claim 10, wherein the first surface of the cover further includes a second concave portion that is concave with respect to the light source;

wherein the second concave portion of the first surface of the cover includes two concave portions that are concave with respect to the light source;

wherein the convex portion of the first surface of the cover is disposed between the two concave portions;

wherein the second surface of the lens further includes a second concave portion that is concave with respect to the light source;

wherein the second concave portion of the second surface of the lens includes two concave portions that are concave with respect to the light source; and wherein the convex portion of the second surface of the lens is disposed between the two concave portions of the second concave portion of the second surface of the lens.

12. The method of claim 11, further comprising:

disposing each of the two concave portions of the second concave portion of the first surface of the cover over a respective one of the two concave portions of the second concave portion of the second surface of the lens.

13. A lighting system comprising:

a light source;

a lens spaced apart from the light source by a first gap and including a first surface to receive light from the light source, the lens further including a second surface through which at least a portion of the light received by the first surface of the lens exits the lens; and a cover spaced from the lens by a second gap and including a first surface to receive at least a portion of the light that exits the lens, the cover further including a second surface through which at least a portion of the light received by the first surface of the cover exits the cover;

wherein the second surface of the lens includes a convex portion that is convex with respect to the light source;

wherein the first surface of the cover includes a convex portion that is convex with respect to the light source and disposed over the convex portion of the second surface of the lens; and wherein the second surface of the cover is flat.

14. The lighting system of claim 13, wherein the first surface of the lens faces toward the light source;

wherein the second surface of the lens faces toward the first surface of the cover; and wherein the at least a portion of the light that exits the cover through the second surface of the cover has a batwing shaped light distribution.

15. The lighting system of claim 13, wherein the convex portion of the first surface of the cover receives the convex portion of the second surface of the lens, at least in part.

16. The lighting system of claim 13, wherein the convex portion of the first surface of the cover includes two convex portions that are convex with respect to the light source;

wherein the first surface of the cover further includes a first concave portion that is concave with respect to the light source and disposed between the two convex portions;

wherein the convex portion of the second surface of the lens includes two convex portions that are convex with respect to the light source;

wherein the second surface of the lens further includes a first concave portion that is concave with respect to the light source and disposed between the two convex portions of the convex portion of the second surface of the lens; and wherein the first concave portion of the first surface of the cover is disposed over the first concave portion of the second surface of the lens.

17. The lighting system of claim 16, wherein the first surface of the cover further includes a second concave portion that is concave with respect to the light source;

wherein the second concave portion of the first surface of the cover includes two concave portions that are concave with respect to the light source;

wherein the convex portion of the first surface of the cover is disposed between the two concave portions;

wherein the second surface of the lens further includes a second concave portion that is concave with respect to the light source;

wherein the second concave portion of the second surface of the lens includes two concave portions that are concave with respect to the light source; and wherein the convex portion of the second surface of the lens is disposed between the two concave portions of the second concave portion of the second surface of the lens.

18. The lighting system of claim 17, wherein each of the two concave portions of the second concave portion of the first surface of the cover are disposed over a respective one of the two concave portions of the second concave portion of the second surface of the lens.

\* \* \* \* \*